Feb. 5, 1946.  F. BURCHELL ET AL  2,393,970

DISPLAY DEVICE

Filed Aug. 3, 1943  2 Sheets—Sheet 1

Feb. 5, 1946.   F. BURCHELL ET AL   2,393,970
DISPLAY DEVICE
Filed Aug. 3, 1943   2 Sheets-Sheet 2

INVENTORS
Ffoad Burchell
Barbara Irvine
BY
Kenyon & Kenyon
ATTORNEYS

Patented Feb. 5, 1946

2,393,970

UNITED STATES PATENT OFFICE 2,393,970

DISPLAY DEVICE

Fford Burchell and Barbara Ivins, New York, N. Y., assignors to Burchell-Holloway Corporation, New York, N. Y., a corporation of New York Application August 3, 1943, Serial No. 497,180

3 Claims. (Cl. 88—65)

This invention relates to a method and apparatus for producing in a display device designs with changing colors and apparent motion, and more specifically to such a method and apparatus utilizing translucent designs of doubly refracting or birefringent material that are arranged to be acted upon by polarized light.

Heretofore such apparatus has comprised a light source, a polarizer and an analyzer with interposition between the two of a birefringent design, and either the polarizer or analyzer has been rotated so that the optical axis of the polarizer or analyzer was made to vary with respect to the other. The polarized light was intercepted by the birefringent design, and the optical axis of the polarized light varied in passing from polarizer to analyzer. The action of the birefringent design on the polarized light passing through it resulted in changing color effects which were visible when viewed through the analyzer. The color effect, by choice of the design and its component parts (for example, in a manner described in a co-pending application Serial No. 337,744, filed May 29, 1940), could be caused to vary greatly and to produce novel and startling effects. Colors could be made to pass successively along a portion of the design, and the design could be made to show changes in size that, while seemingly real, were optical illusions. Similarly, apparent relative displacement of parts of the design could be made to appear.

In accordance with the present invention, a new method and principle are employed for causing the changing colors and apparent motion in displays of the type referred to.

It is characteristic of birefringent materials that their optical properties vary at different angles through the material. This variation differs with the materials used. In our invention, we make use of this variation to produce changes of color in a design of birefringent materials. To this end, the design is arranged between an analyzer and a polarizer, and a suitable member of birefringent material is arranged either between the analyzer and the design, or between the polarizer and the design. This birefringent member is then moved in such a way that the angle between different portions of the design and the portions of the sheet adjacent thereto is varied. Such movement may be produced in different ways, for example either by tipping a flat sheet, or alternately bending and flattening the sheet, or by making ripples or waves travel transversely of the sheet. The desired effect may also be achieved by forming the sheet of birefringent material with bends or corrugations and by suitably moving the corrugated sheet relatively to the design. The corrugated sheets may be bent into tubular form with the corrugations running lengthwise, the corrugated tube so formed being rotated in proximity to the design.

The principal object of the invention is to provide a method and an apparatus that will efficiently produce the desired changes in color and apparent motion on the principle above stated.

Other objects, features and advantages will appear more fully hereinafter.

To the accomplishment of the said objects, the invention consists in the novel method, construction and operation of parts hereinafter described and sought to be defined in the appended claims, reference being had to the accompanying drawings forming part hereof which show merely for purposes of illustration, certain preferred embodiments of the invention, it being expressly understood, however, that changes may be made in practice within the scope of the appended claims without departing from the invention.

In the drawings, in which similar reference characters denote corresponding parts:

Fig. 7 is a top plan view of the embodiment of the invention shown in Fig. 6.

Figure 1:
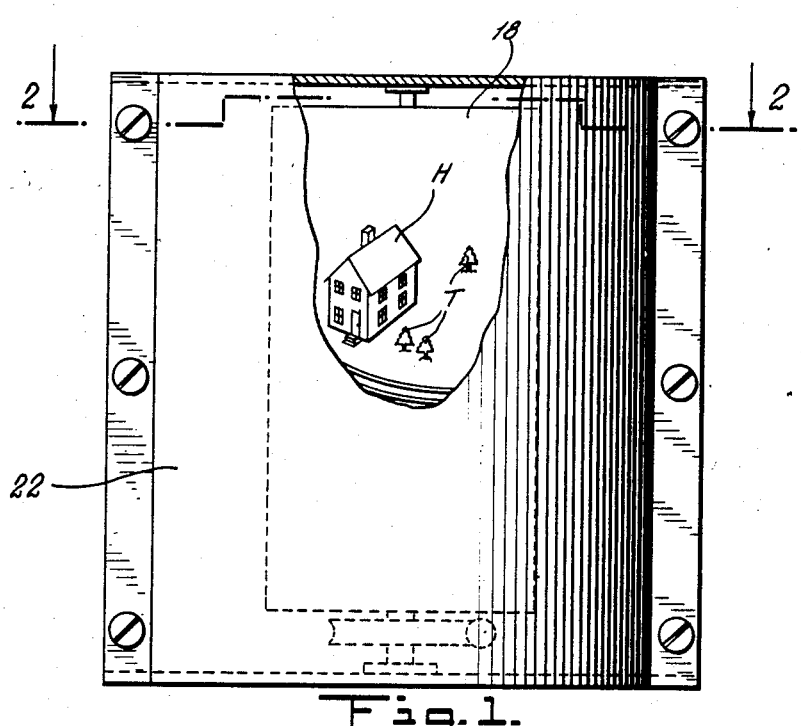
Figure 1 is a front elevation of one form of device embodying the invention.
Figure 2:
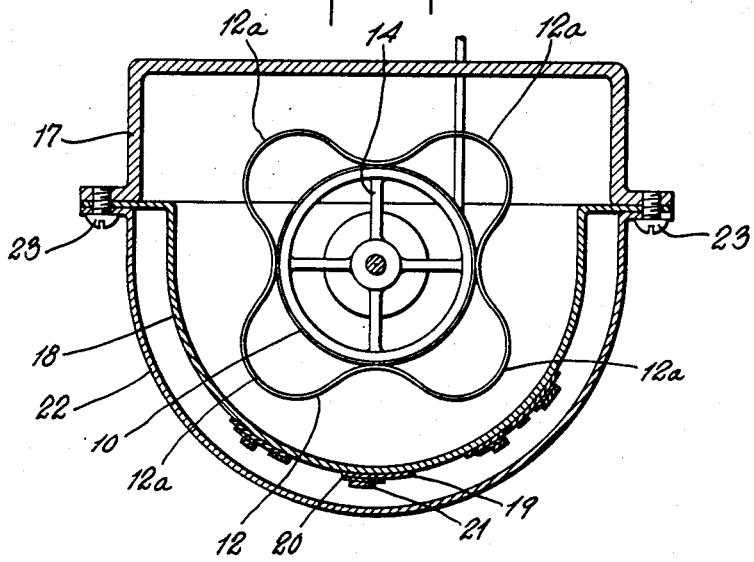
Fig. 2 is a transverse section taken along line 2—2 of Fig. 1 viewed in the direction of the arrows.

Referring to Figs. 1 and 2, 10 denotes an upright cylinder of polarizing material, e. g., "Polaroid." The polarizing direction of the "Polaroid" tube may be in any desired direction. Within the cylinder 10, and preferably coaxial therewith, is arranged a suitable source of light 11 (see Fig. 6). This may be an elongated electric light of suitable design. Any other suitable source of light may be used, preferably one that will distribute the light uniformly along the walls of the cylinder 10.

Since the polarizer tube 10 is of homogeneous polarizing material, its polarizing axis does not vary when the cylinder is rotated about its longitudinal axis. Hence it would be impossible to achieve changing color effects merely by so rotating the cylinder. To achieve such effects, we utilize birefringent material so constructed and arranged that the angle between different portions of the birefringent design and the adjacent portions of the birefringent material may be readily varied.

In Figs. 1 and 2, the body of birefringent material is shown as a vertical tube or cylinder 12 formed with a plurality of corrugations 12a. The tube 12 is preferably arranged coaxially with the tube 10 and secured thereto in any suitable way, as by adhesion. The corrugations 12a are arranged to run lengthwise of the tube 12, preferably in a vertical direction.

When a beam of polarized light is incident upon a point of a surface of doubly-refracting, or birefringent, body, there arise in the body two beams, the direction of vibration of one of which is perpendicular to the other. One of the beams is propagated more rapidly than the other. The birefringent material is characterized by its optical axis, commonly called its "significant axis or direction." This refers to the projection upon its surface of the direction of vibration of the light of that one of the two beams which is propagated most rapidly. If such birefringent material intercepts polarized light, it has the effect of altering the axis of polarization of the polarized light. Preferably the optical or "significant" axis of the material of the tube 12 extends at an angle to the corrugations and also at an angle to the optical axes of the polarizer design and analyzer.

The colors of the design in the finished display will depend upon the birefringent material used in the tube 12. While Cellophane, or any other birefringent plastic sheet material may be used for this purpose, we prefer to use ethylcellulose. This material gives a large variation in color for a given change in optical direction.

Figure 6:
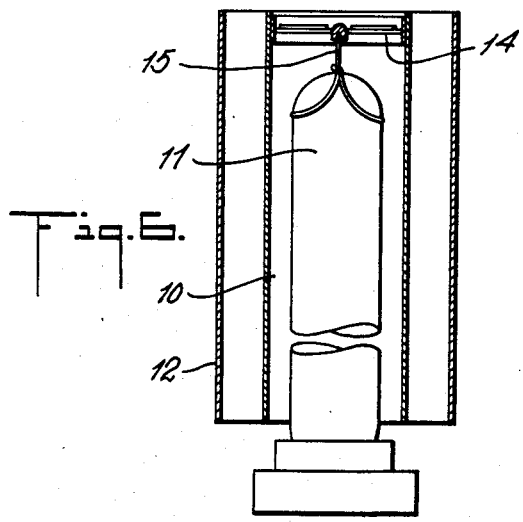
Fig. 6 is a vertical section of an embodiment of the invention in which the movable parts are driven by heat.
Figure 2:
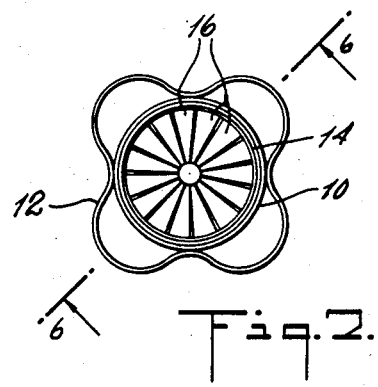

The coaxial tubes 10 and 12 are supported as a unit from any suitable means, such as frame 14 (Figs. 2 and 6), in such a way that they may be rotated about their axis. The frame 14, as shown in Fig. 6, is mounted upon a pintle 15 formed of a wire resting securely on the top of the light 11. Any suitable means may be provided to rotate the frame 14 and the tubes carried thereby. For example, in the embodiment shown in Figs. 6 and 7, the tubes 10 and 12 are rotated by a heat motor drive. Referring to Fig. 7, the frame 14 is provided with a series of fan or propeller blades 16 inclined to the horizontal. These blades are located above the light tube 11. The heat generated by the tube 11 while it is lit creates convection currents of air that rise and impinge upon the blades 16, causing the latter to rotate and carry with them the tubes 10 and 12.

The tubes 10 and 12 are preferably arranged within a casing 17 (Fig. 2). To support the design, an isotropic sheet 18 is secured at its edges to the casing 17, as by screws 23. Preferably the sheet 18 is of matte cellulose acetate or "vinylite" or other suitable isotropic transparent or translucent material. This sheet has mounted on it in any suitable way a design, for example, the figure of the house H and trees T seen in Fig. 1. The various elements of the design are built up of one or more layers 19, 20 and 21 of birefringent material, such as Scotch tape, Cellophane or the like, in the manner described in the aforementioned application. Some of the portions of the design have fewer layers than others, and the significant axes of the birefringent material in the layers vary in accordance with the effects that it is desired to have produced by the action of the light rays emerging from the tube 12. In the form of the invention shown in Figs. 1 and 2, the design-bearing sheet 18 is curved, preferably concentrically with the tubes 10 and 12, and the design is suitably adhered to it. This curved arrangement has the advantage that identical effects can be obtained when the display is viewed from different angular positions with respect to the display surface.

An analyzer 22 consisting of a sheet of polarizing material, preferably "Polaroid," is positioned to lie in front of the design or pattern on the sheet 18. In Figs. 1 and 2, this analyzer 22 is also semicircular in form, being secured at its edges to the frame 17, as by the screws 23. Both sheet 18 and sheet 22 are preferably arranged coaxially with the tubes 10 and 12. The polarizing axis of the analyzer 22 may be either parallel to or at an angle with respect to the polarizing axis of the tube 10.

In the operation of the device shown in Figs. 1, 2, 6 and 7, the light source 11 gives substantially uniform distribution of light along the whole interior of the polarizer tube or cylinder 10. The light passing through this tube is all polarized by it in the direction of the polarizing axis of the material of which the tube is made. However, the optical effect of the polarized light emerging from the tube or cylinder 10 that reaches the design, and ultimately the eye of the viewer through the analyzer 22 is repeatedly altered by the corrugations 12a in the tube 12 that intercepts the polarized light rays passing towards the design. This is due to the changing angle between each particular portion of the design and the adjacent portion of the tube 12 that is traversed by the same light ray. This constantly changing angle alters the light falling upon the design carried by the sheet 18, causing changing and flowing colors and apparent motion in the birefringent design when viewed through the analyzer 22. The birefringent material of the design, as stated above, splits the polarized beams into two beams at right angles and out of phase. The analyzer 22 restores the beams to plane polarized condition and integrates them to produce interferences whereby one color or another of the spectrum is cancelled out. This action of the birefringent design and analyzer, together with the successively varying angle between particular portions of the design and adjacent portions of the tube 12, produce the novel color and other effects desired.

The apparent flow of color from one part of the design to another, so far as produced by the design, can be effected by progressive variation in the optical orientation of the birefringent material of the design. This flow can be made to take place in any desired direction. Areas in the design can be made to appear to change in size, and many other unusual effects can be produced by properly arranging the elements of the birefringent material in the manner described in detail in the aforementioned application.

Figure 3:
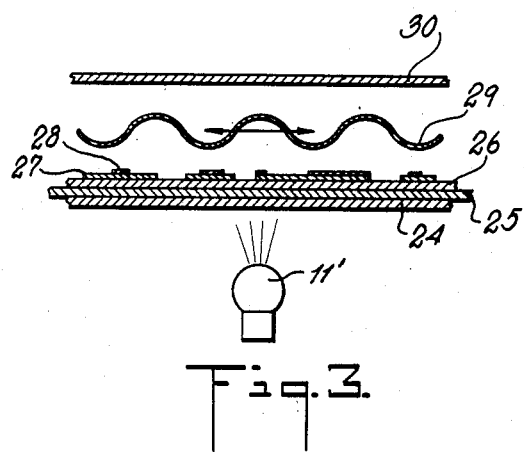
Figs. 3, 4 and 5 are diagrammatic sections on an enlarged scale illustrating other embodiments of the invention.

In Fig. 3 the invention is embodied in a display device having a flat display surface. As shown in that figure, 11' is the source of light. Arranged to be illuminated by the said source of light, is a sheet 24 of translucent isotropic material, for example, matte cellulose acetate or the like. The function of the sheet 24 is to conceal the source of light, while permitting its rays to pass through it. On the forward face of the sheet 24, a polarizing sheet 25 of "Polaroid" or other suitable material is arranged. A sheet of isotropic material bearing the birefringent design is shown at 26, the various layers of birefringent material being shown, for example at 27 and 28. The birefringent material for producing by its motion the variations in color in the design is, as shown in this figure, in the form of a flat corrugated sheet 29 which is movable, as shown by the arrow, in a direction at right angles to the corrugations in the sheet. An analyzer of "Polaroid" or other suitable material, is arranged in front of the birefringent sheet 29, as shown at 30. By moving the sheet 29 in the direction of the arrow, results similar to those described in connection with Figs. 1 and 2 are obtained when the design is viewed through the analyzer 30. However, the color effects which are obtained when this display is viewed from different angular positions are not identical, as they are with the device in Figs. 1 and 2.

Figure 4:
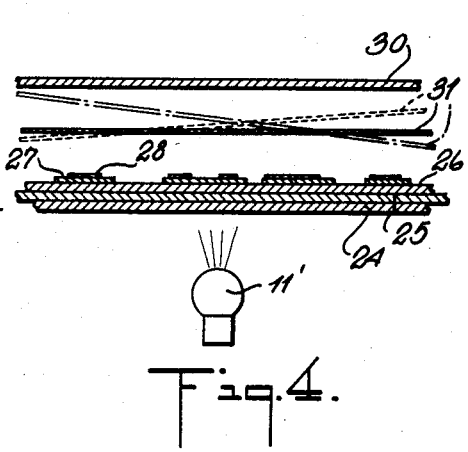

In the embodiment of the invention shown in Fig. 4, the light source 11', isotropic sheet 24, polarizer 25, sheet 26 bearing the birefringent design and analyzer 30 are arranged the same as in Fig. 3. However, the variation in the angular relation of the design and movable birefringent member is obtained by using a flat sheet of birefringent material 31 whose face may be arranged at different angular relations with respect to the design as shown respectively in solid lines, dot and dash lines and dotted lines. By tilting the sheet 31 at different angles, as shown, the desired changing colors and apparent motions in the design may be obtained when the design is viewed through the analyzer 30.

Figure 5:
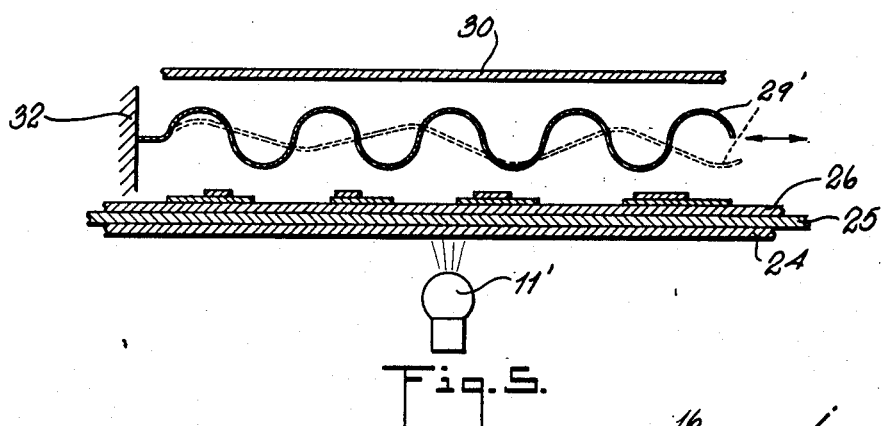

In Fig. 5, the light source 11', the isotropic sheet 24, the polarizer 25, the design bearing sheet 26 and the analyzer 30 are likewise arranged in the same manner as in Fig. 3. A corrugated sheet of birefringent material 29' is also employed, being arranged between the analyzer 30 and the design bearing sheet 26. However, in this form of the invention, the changes in the relative angular position of each particular part of the design and the adjacent portion of the birefringent sheet 29' are produced by alternately flattening and deepening the corrugations in the sheet 29', thus producing a wave motion across the sheet. To this end the said sheet is fastened at one end, as at 32, to a side wall of the frame. The other end of the sheet may be grasped by hand and moved back and forth at right angles to the corrugations so as to alternately flatten and deepen the corrugations. Any suitable means may be employed to so move the sheet. The flattened sheet is shown in Fig. 5 in dotted lines, the sheet being shown with deeper corrugations in solid lines.

Changes in the color effects to be produced can be obtained by changing the direction of the corrugations in the birefringent material with respect to the optical or "significant" axis of that material, also by changes in the direction of the optical axis of the birefringent material with respect to the optical axes of the polarizer, design, and analyzer. It is to be understood that various other changes may be made in practice without departing from the spirit and scope of this invention.

Having described our invention, what we claim as new and desire to protect by Letters Patent is:

1. A device of the character described comprising a tubular polarizer, a source of light within said polarizer, a corrugated tube of birefringent material arranged coaxially with the said polarizer and externally thereof, the corrugations in said tube extending substantially parallel with the common axis of said polarizer and said birefringent tube, a curved analyzer whose center of curvature is said common axis arranged in front of a portion at least of said polarizer and of said birefringent corrugated tube, a curved light-permeable member of isotropic material whose center of curvature likewise is said common axis interposed between said birefringent corrugated tube and said curved analyzer, a birefringent design arranged on the surface of said light-permeable member, and means to rotate said tubular polarizer and said corrugated tube about said common axis, whereby light emanating from said light source toward an observer of said birefringent design located externally of said curved analyzer will undergo multiple alterations in axes of polarization, said alterations being effected by the continual change in geometrical angles toward and away from each other between any given portion of said design and the surface of said corrugated birefringent member as the latter is rotated on said common axis.

2. A device of the character describer comprising a tubular polarizer, a source of light within said polarizer, a corrugated tube of birefringent material arranged coaxially with said polarizer and externally thereof, the corrugations in said tube extending substantially parallel with the common axis of said polarizer and said corrugated birefringent tube, a curved analyzer whose center of curvature is said common axis arranged in front of a portion at least of said polarizer and said birefringent corrugated tube, a birefringent design located between said curved analyzer and the said polarizer and said birefringent corrugated tube, and means to rotate said corrugated tube about said common axis whereby light emanating from said light source toward an observer of said birefringent design located externally of said curved analyzer will undergo multiple alterations in axes of polarization, said alterations being effected by the continual change in angle toward and away from each other between any given portion of the surface of said design and the surface of said corrugated birefringent member as the latter is rotated.

3. A device of the character described comprising a casing, a tubular polarizer, a source of light within said polarizer, a corrugated tube of birefringent material arranged coaxially with said polarizer and externally thereof, the corrugations extending substantially lengthwise of the tube, a frame for supporting said polarizer and said tube rotatably, means to support said frame rotatably in said casing, a curved analyzer whose center of curvature is the common axis of the polarizer and corrugated tube, a birefringent design, means to support said design between said corrugated tube and said curved analyzer and means to rotate said frame about said common axis whereby light emanating from said light source toward an observer of said birefringent design located externally of said curved analyzer will undergo multiple alterations in axes of polarization, said alterations being effected by the continual change in geometrical angles toward and away from each other between any given portion of the surface of said design and the surface of said corrugated member as the latter is rotated.

FFORD BURCHELL.
BARBARA IVINS.